United States Patent [19]

Strehl

[11] 4,236,244
[45] Nov. 25, 1980

[54] DIGITAL COMMUNICATIONS TRANSMISSION SYSTEM

[75] Inventor: Herbert Strehl, Munich, Fed. Rep. of Germany

[73] Assignee: Siemens Aktiengesellschaft, Berlin & Munich, Fed. Rep. of Germany

[21] Appl. No.: 14,140

[22] Filed: Feb. 22, 1979

[30] Foreign Application Priority Data

Feb. 23, 1978 [DE] Fed. Rep. of Germany ....... 2807785

[51] Int. Cl.³ .............................................. H04L 5/14
[52] U.S. Cl. ................................................. 370/30
[58] Field of Search .................. 178/58 R, 2 R, 3, 61; 179/15 FD, 2 DP; 325/308, 309

[56] References Cited

U.S. PATENT DOCUMENTS

| 3,655,915 | 4/1972 | Liberman et al. | 178/58 R |
|---|---|---|---|
| 3,936,602 | 2/1976 | Korver | 178/58 R |
| 3,937,882 | 2/1976 | Bingham | 179/2 DP |
| 3,993,867 | 11/1976 | Blood, Jr. | 370/24 |
| 4,041,398 | 8/1977 | Ellis | 178/58 R |

FOREIGN PATENT DOCUMENTS 2040401 1/1976 Fed. Rep. of Germany .
2628852 11/1977 Fed. Rep. of Germany .

Primary Examiner—Thomas A. Robinson
Attorney, Agent, or Firm—Hill, Van Santen, Steadman, Chiara & Simpson

[57] ABSTRACT

A digital communications transmission system includes calling and called digital terminals which are interconnected with a two-wire line or a four-wire line by way of respective termination sets. Each terminal includes a transmitter, a receiver and a calling device. The transmission system is particularly characterized in that there is provided in the calling terminal a transmitter which transmits signals in a first frequency position and a receiver which receives signals in a second frequency position, while the called terminal includes a transmitter which transmits signals in the second frequency position and a receiver which receives signals in the first frequency position.

14 Claims, 7 Drawing Figures

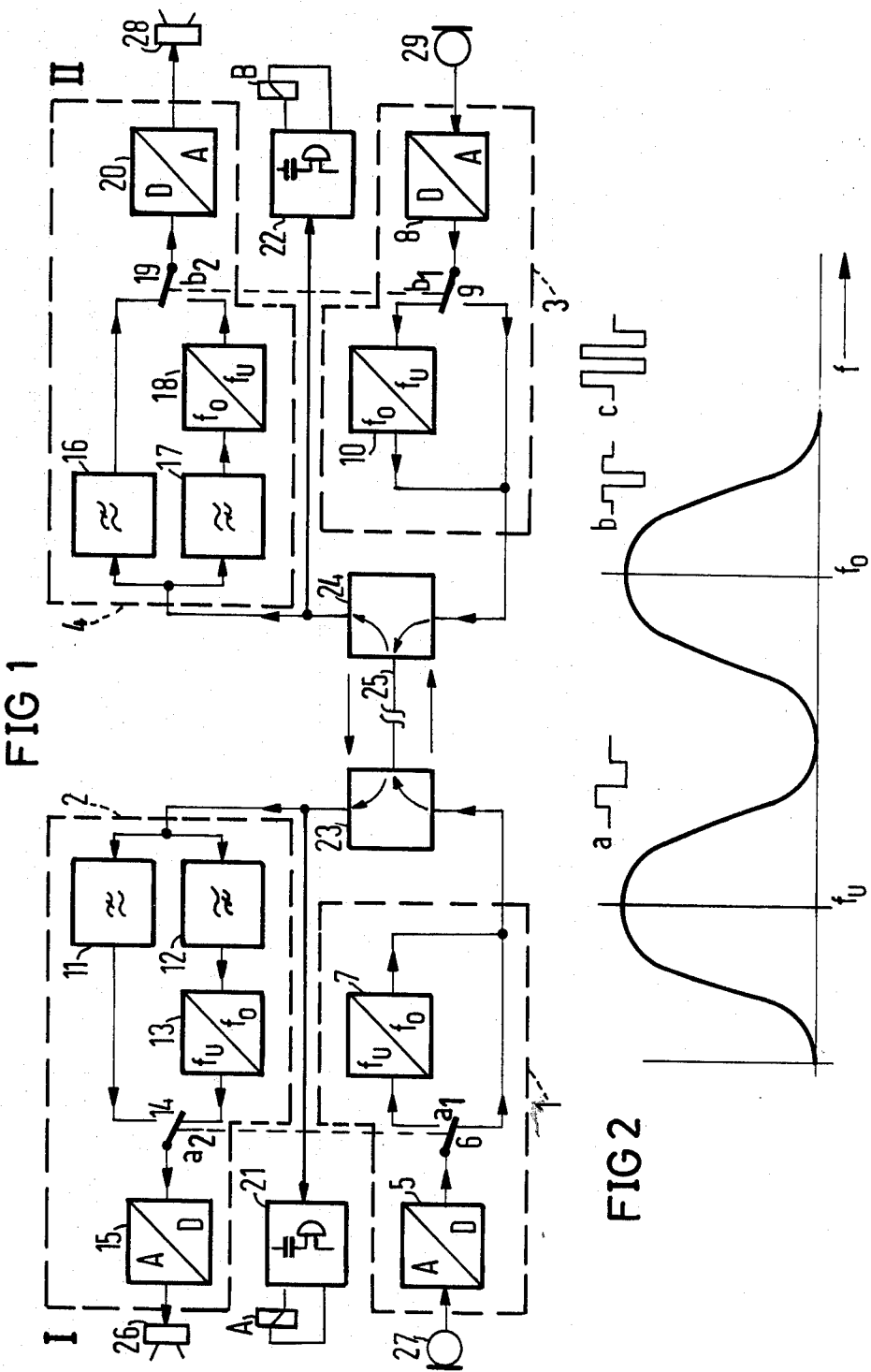

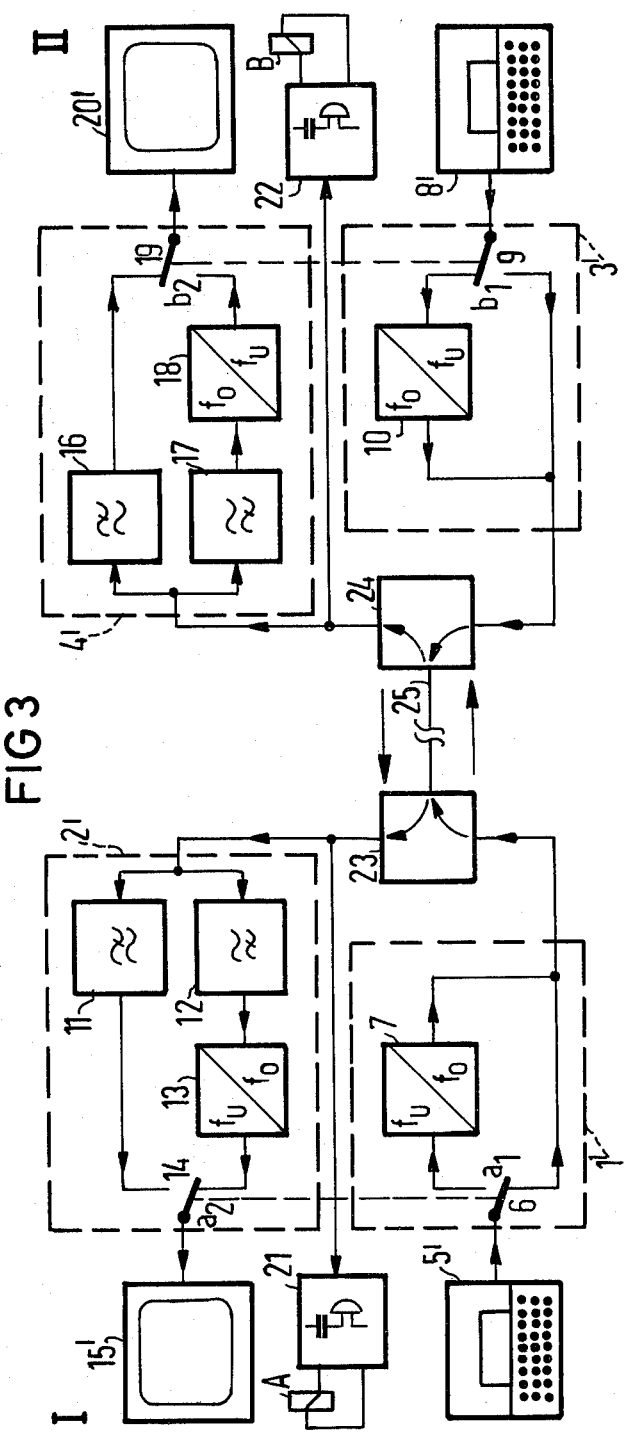

DIGITAL COMMUNICATIONS TRANSMISSION SYSTEM

BACKGROUND OF THE INVENTION

1. Field of the Invention

The present invention relates to a digital communications transmission system having two terminals connected by means of a two-wire line, which terminals include a terminating set, a transmitter, a receiver and a calling device.

2. Description of the Prior Art

In analog technology, termination sets (bridge circuits) are used for the separation of the outgoing and incoming directions on two-wire lines, because the moderate stop-band attenuation which is dependent on the respective line impedance only causes an overhearing or superposition of its own speech signals. When the subscriber employs digital terminal devices, the moderate stop-band attenuation of the termination set can effect a disruption of the received signal by means of its own transmission signal. This is the case in both speech signal codes as well as in data devices.

The above difficulty can be countered either by means of the improvement of the termination set stop-band attenuation, or by means of the employment of segregated band systems. The former technique is effected according to the German allowed and published application No. 2,628,852 by means of automatic balancing of the simulation or, according to U.S. Pat. No. 3,993,867, by means of compensation of the transmission pulses in the receiver branch. The latter technique can be realized according to the German Pat. No. 2,040,401, either using time multiplex technology or with frequency division multiplex technology.

The processes for improving the termination set stop-band attenuation have the disadvantage that a range significantly larger than 4 km cannot be achieved because the disruption of the weak reception signals by the outgoing transmission signals then becomes too great, even given improved termination set attenuation. Added thereto is the fact that, upon employment in the subscriber network, a reserve for the near-end crosstalk must be present.

Even in an arrangement functioning according to the time multiplex process, the range cannot be improved without further ado, because the consideration of the signal running time with increasing distance demands a greater compression of the bit sequences, which leads to higher transmission bit rates. Moreover, a transmission bit rate of, for example, 256 kbit/s has the inherent danger of coming into conflict with the interference beam protection conditions when the transmission system is employed on unshielded lines.

Moreover, as is known in the art, near-end crosstalk interference arises in multi-pair subscriber networks both in two-wire, as well as in four-wire operation.

SUMMARY OF THE INVENTION

The object of the present invention is to provide a digital communications transmission system having high stopband attenuation with relatively low expense and which, moreover, eliminates the near-end crosstalk interference.

The above object is achieved in a system of the type generally described above in that a transmitter which transmits signals in a first frequency position and a receiver which receives signals in a second frequency position are provided in a calling terminal, and that a transmitter which transmits signals in the second frequency position and a receiver which receives signals in the first frequency position are provided in a called terminal.

By means of the interaction of an ordinary termination set having a simplified frequency division multiple access, the stop-band attenuation can be boosted to the required values for a greater range, without having the expense for the circuitry exceed a measure which can be justified to the subscriber.

It is advantageous for the practical implementation of the invention when an analog/digital converter is provided in the transmitter which has an input which serves as the input of the transmitter, and a transmission transfer switch is included whose input is connected with the output of the analog/digital converter. Also, a first frequency converter is provided whose input is connected with a first output of the transmission transfer switch and whose output is connected with a second output of the transmission transfer switch and serves as the output of the transmitter. In addition, in the receiver a low-pass filter and a high-pass filter are provided whose inputs serve as the input for the receiver, a second frequency converter whose input is connected with the output of the high-pass filter, a receiving transfer switch having one input connected with the output of the second frequency converter and another input connected with the output of the low-pass filter, and a digital/analog converter whose input is connected with the output of the receiving transfer switch and whose output serves as the output of the receiver.

It is also advantageous when a diplexer is provided in place of the termination set, the low-pass filter and the high-pass filter.

Traffic between various subscribers of a traditional two-wire transmission system is possible when it is achieved by means of an automatic transfer device so that, for example, the calling subscriber always transmits in the lower frequency position and the called subscriber always answers in the upper frequency position. This transfer device can be triggered, for example, by means of the calling signal.

This process is advantageous when an existing two-wire subscriber's extension station system is to be converted to digital operation, in that few alterations are then required for two-wire transmission.

In the case of larger distances in subscriber networks it is expedient to subdivide the transmission distance from subscriber to subscriber in the exchange. By means of this subdivision and a determination that all signals proceeding from the exchange are transmitted in the one frequency position and all signals proceeding toward the exchange are transmitted in the other frequency position, it is achieved that the nearend crosstalk no longer has a disrupting influence. This is also true when this process is employed in four-wire lines instead of in two-wire lines.

Thereby, it is advantageous when a diplexer is provided in place of the high-pass filter and the termination set.

Central transfers can be advantageously introduced by means of discrimination between outgoing and incoming traffic.

Finally, it is also advantageous when a code converter is provided as the frequency converter, since then the expense is particularly low.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic circuit diagram of a transmission system constructed in accordance with the present invention;

FIG. 2 illustrates the frequency positions of the signals for both directions of transmission;

FIG. 3 illustrates a second embodiment of a transmission system constructed in accordance with the present invention;

DESCRIPTION OF THE PREFERRED EMBODIMENTS

Figure 4:
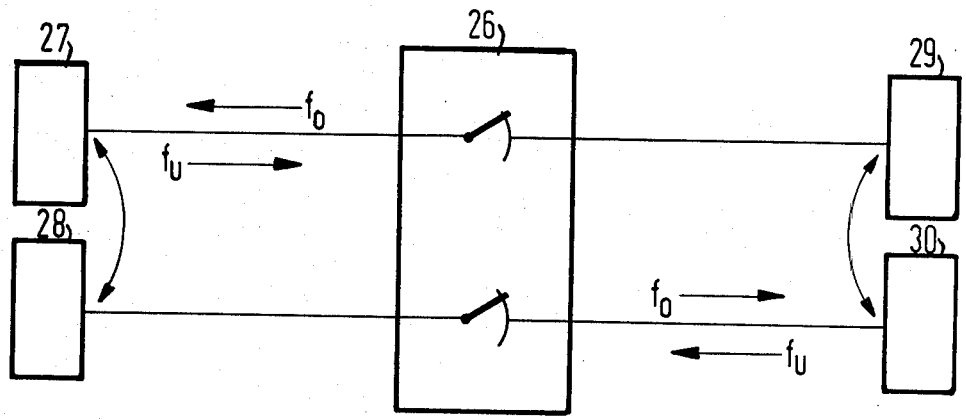
FIG. 4 is a schematic diagram illustrating near-end crosstalk interference with a frequency conversion having automatic transfer of the frequency position at the subscriber.

Referring to FIG. 1, a first embodiment of a communications transmission system according to the present invention is illustrated showing a calling terminal I and a called terminal II.

The calling terminal I includes a transmitter 1 and a receiver 2 which are connected to a two-wire line 25 by way of a termination set 23.

The transmitter 1 includes an analog/digital converter 5, a transmission transfer switch 6 and a frequency converter 7.

The receiver 2 includes a low-pass filter 11, a high-pass filter 12, a frequency converter 13, a receiving transfer switch 14 and a digital/analog converter 15.

In addition, a ringing signal receiver 21, a relay A, a receiver speaker or earpiece 26, and a transmitter or microphone 27 are provided in the terminal I. The transmission transfer switch 6 and the receiving transfer switch 14 are realized as contacts $a_1$ and $a_2$ of the relay A. A diplexer can also be employed in place of the low-pass filter 11 and the high-pass filter f12.

In the terminal II, the transmitter 3 is constructed like the transmitter 1 and the receiver 4 is constructed like the receiver 2. In addition, a ringing signal receiver 22, a relay B, a receiver earpiece 28, a microphone 29 and a termination set 24 are provided, as in the terminal I. A transmission transfer switch 9 and a receiving transfer switch 19 are realized as contacts $b_1$ and $b_2$ of the relay B and transmission is carried out over the two-wire line 25, as is the case with the terminal I.

When a call goes from the terminal I to the terminal II, then the relays A and B switch the transmission transfer switches 6 and 9 and the receiving transfer switches 14 and 19 in the manner illustrated on the drawing.

When one speaks into the microphone 27, then the analog/digital converter 5 converts the analog signal into a digital signal whose output spectrum has its center at a frequency $f_u$ (FIG. 2). By way of the transfer switch 6, the termination set 23, the two-wire line 25, the termination set 24, the low-pass filter 16 and the receiving transfer switch 19, this digital signal arrives at the digital/analog converter 20 which converts the digital signal into an analog signal which can be heard at the receiver earpiece 28. When one now speaks into the microphone 29, the analog signal is converted into a digital signal in the analog/digital converter 8, this digital signal having a spectrum which is centered at the frequency $f_u$. This signal proceeds by way of the transmission transfer switch 9 to the frequency converter 10 which converts the digital signal into a digital signal having a spectrum with a center frequency $f_o$. This signal proceeds by way of the termination set 24, the two-wire line 25, the termination set 23, and the high-pass filter 12 to the frequency converter 13 which again converts the digital signal into a spectrum having a central frequency $f_u$. From there, the digital signal arrives by way of the receiving transfer switch 14 and the digital/analog converter 15 to the receiver earpiece 26. When the terminal II is the calling station, then both transmission transfer switches 6 and 9 and both receiving transfer switches 14 and 19 are reversed and the processed described takes place in the opposite direction.

Since the transmission in both directions ensues in different frequency positions, the stop-band attenuation already present because of the termination sets 23 and 24 is increased.

FIG. 2 illustrates, in principle, a separation of the center frequencies of the output spectrums as they are effected by means of transformation of the pulses a into the pulses b or c.

FIG. 3 illustrates a second embodiment of the invention in which there is a terminal I and a terminal II.

The terminal I of FIG. 3 is different from the terminal I of FIG. 1 in that the microphone 27 and the analog/digital converter 5 have been replaced by a data transmitter 5' and the digital/analog converter 15 and the receiver earpiece 26 have been replaced by a data receiver 15'.

Correspondingly, in the terminal II, a data transmitter 8' takes the place of the microphone 29 and the analog/digital converter 8 and a data receiver 20' takes the place of the digital/analog converter 20 and the receiver earpiece 28. Otherwise, the components and their functions correspond to that of the first communications transmission system illustrated in FIG. 1.

FIG. 4 illustrates a transmission system having a two-wire transmission medium 26 and four terminals 27–30. The terminals 27 and 30 in this illustration are calling terminals and the terminals 28 and 29 are called terminals. The transmission from the terminal 27 to the terminal 29 and from the terminal 30 to the terminal 28 is carried out with an output spectrum having its maximum at the frequency $f_u$. The transmission in the opposite direction, respectively, is carried out with signals of an output spectrum which has its maximum at the frequency $f_o$. A disadvantage of this process is that the connection line lengths of the two terminals for the transmission are additive and that, in unfavorable cases, near-end crosstalk interference is possible which can arise between the terminals 27 and 28 or, respectively, the terminals 29 and 30.

Figure 5:
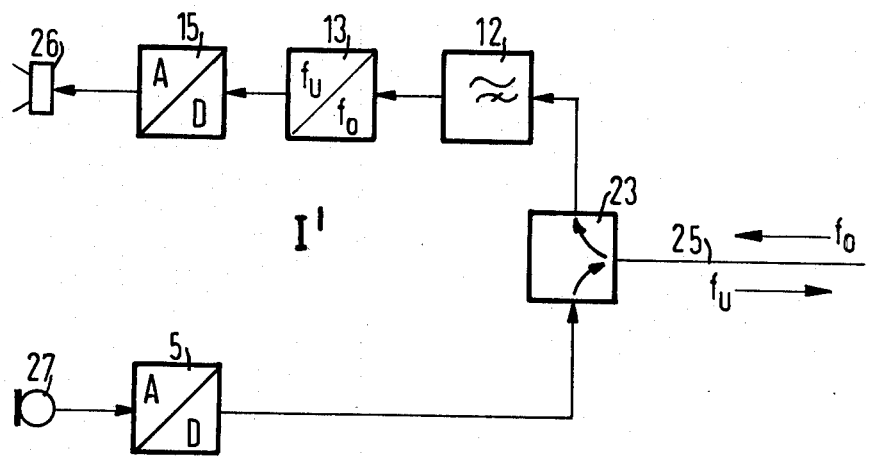
FIG. 5 illustrates a terminal having fixed frequency positions for outgoing and incoming transmission directions.

FIG. 5 illustrates a terminal I' in which the transmission transfer switch 6 and the receiving transfer switch 14 are fixedly adjusted. Transmission from the exchange to the terminal is possible in the upper frequency position and from the terminal to the exchange in the lower frequency position, or vice versa. However, frequency converters are now required in the exchange. A diplexer can also be employed in place of the termination set 23 and the high-pass filter 12.

Figure 6:
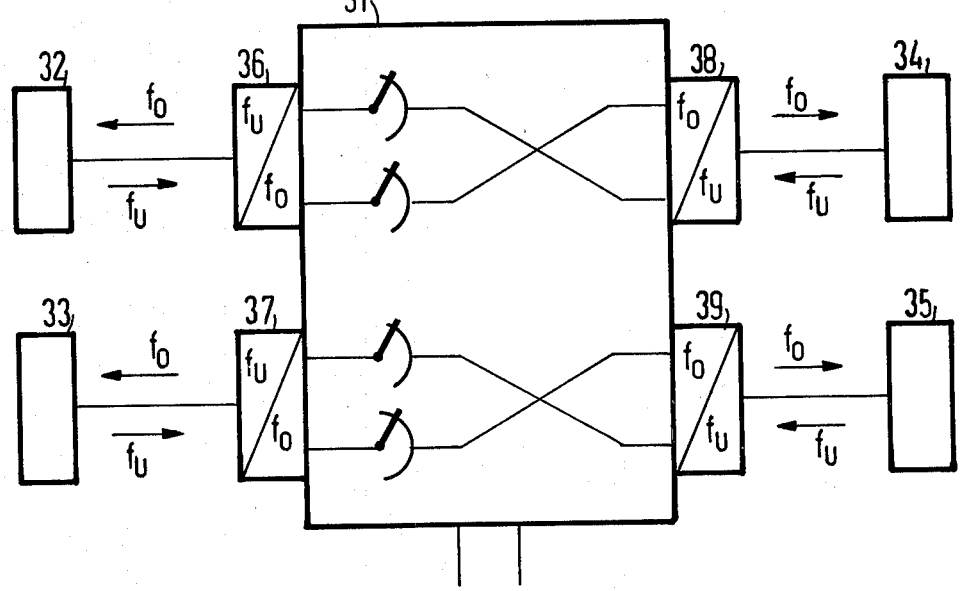
FIG. 6 is a schematic presentation of a four-wire transmission system having frequency conversion at the subscriber and in the exchange.

FIG. 6 illustrates such a system having a four-wire transmission medium 31, with terminals 32–35 and frequency converters 36–39. The frequency positions are interchanged with the frequency converters 36–39.

Figure 7:
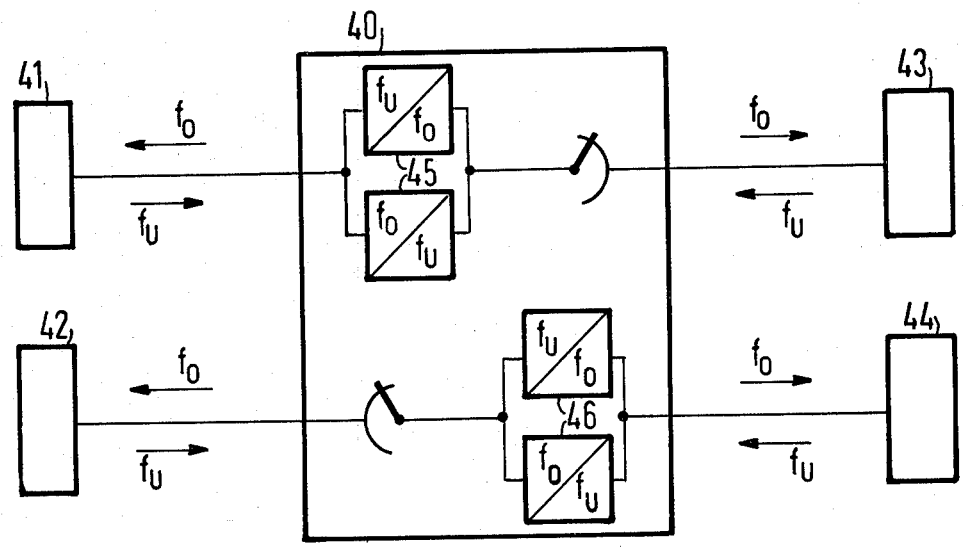
FIG. 7 is a schematic illustration of a two-line transmission system having central frequency conversion and control.

FIG. 7 illustrates a system having a two-wire transmission medium 40 and subscriber stations 41–44 in which the frequency converters 45 and 46 are centrally arranged and a discrimination is carried out between incoming and outgoing traffic.

The terminals 27–30, 32–35 and 41–44 in FIGS. 4, 6 and 7 can be terminals constructed in accordance with FIG. 5.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A digital communications transmission system comprising:
   a transmission medium;
   a pair of termination sets connected to opposite ends of said transmission medium; and
   a calling terminal and a called terminal connected to respective ones of said termination sets,
   said calling terminal including a transmitter operable to transmit signals in a first frequency position, and a receiver operable to receive signals in a second frequency position, said called terminal including a transmitter operable to transmit signals in said second frequency position and a receiver operable to receive signals in said first frequency position.
   each of said transmitters comprising a digital input circuit for inputting digital signals, a frequency converter having an input, and an output connected to the respective termination set, a transmission transfer switch including an input connected to said digital input circuit, a first output connected to said input of said frequency converter, and a second output connected in common with said output of said frequency converter.

2. The digital communications transmission system of claim 1, wherein said digital input circuit comprises: a data transmitter.

3. The digital communications transmission system of claim 1, wherein said digital input circuit comprises: an analog/digital converter.

4. The digital communications transmission system of claim 1, wherein each of said receivers comprises:
   a high-pass filter and a low-pass filter connected to said termination set;
   a frequency converter connected to said high-pass filter;
   a receiving transfer switch having a pair of inputs connected to said low-pass filter and to said frequency converter, respectively, and an output; and
   an output circuit connected to said output of said receiving transfer switch.

5. The digital communications transmission system of claim 4, wherein said frequency converters are constructed as code converters.

6. The digital communications transmission system of claim 4, further comprising:
   a ringing signal receiver in each of said terminals connected to said termination circuit and connected to operate said transmitting and receiving transfer switches.

7. The digital communications transmission system of claim 6, wherein each terminal is an exchange.

8. The digital communications transmission system of claim 7, wherein said transmitting and receiving transfer switches are identically set.

9. A digital communications transmission system comprising;
   a transmission medium;
   a pair of termination sets connected to opposite ends of said transmission medium; and
   a calling terminal and a called terminal connected to respective ones of said termination sets,
   said calling terminal including a transmitter operable to transmit signals in a first frequency position, and a receiver operable to receive signals in a second frequency position, and said called terminal including a transmitter operable to transmit signals in said second frequency position and a receiver operable to receive signals in said first frequency position,
   each of said receivers comprising a high-pass filter and a low-pass filter connected to said termination set, a frequency converter connected to said high-pass filter, a receiving transfer switch having a pair of inputs connected to said low-pass filter and to said frequency converter, respectively, and an output, and an output circuit connected to said output of said receiving transfer switch.

10. The digital communications transmission system of claim 9, wherein said output circuit comprises: a data receiver.

11. The digital communications transmission system of claim 9, wherein said output circuit comprises: a digital/analog converter.

12. A digital communications transmission system comprising:
   a transmission medium;
   a pair of termination sets connected to opposite ends of said transmission medium; and
   a calling terminal and a called terminal connected to respective ones of said termination sets,
   said calling terminal including a transmitter operable to transmit signals in a first frequency position, and a receiver operable to receive signals in a second frequency position, and said called terminal including a transmitter operable to transmit signals in said second frequency position and a receiver operable to receive signals in said first frequency position,
   each of said receivers comprising a diplexer including an input connected to said termination set, and a pair of outputs, a frequency converter connected to one of said outputs of said diplexer, a receiving transfer switch having a pair of inputs connected to the other of said outputs of said diplexer and said frequency converter, respectively, and an output, and an output circuit connected to said output of said receiving transfer switch.

13. The digital communications transmission system of claim 12, wherein said output circuit comprises: a data receiver.

14. The digital communications transmission system of claim 12, wherein said output circuit comprises: a digital/analog converter.

* * * * *